United States Patent
Xu et al.

(10) Patent No.: US 10,747,867 B2
(45) Date of Patent: Aug. 18, 2020

(54) AUTHENTICATION AND AUTHENTICATION MODE DETERMINATION METHOD, APPARATUS, AND ELECTRONIC DEVICE

(71) Applicant: Alibaba Group Holding Limited, George Town, Grand Cayman (KY)

(72) Inventors: Wei Xu, Beijing (CN); Liang Li, Beijing (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/561,793

(22) Filed: Sep. 5, 2019

(65) Prior Publication Data

US 2020/0082063 A1    Mar. 12, 2020

(30) Foreign Application Priority Data

Sep. 10, 2018    (CN) .......................... 2018 1 1050088

(51) Int. Cl.
*G06F 21/32*    (2013.01)
*G06K 9/00*    (2006.01)
*G06Q 20/40*    (2012.01)

(52) U.S. Cl.
CPC ......... *G06F 21/32* (2013.01); *G06K 9/00268* (2013.01); *G06K 9/00288* (2013.01); *G06Q 20/40145* (2013.01)

(58) Field of Classification Search
CPC ................. G06F 21/32; G06K 9/00268; G06K 9/00288; G06Q 20/40145
See application file for complete search history.

(56) References Cited

U.S. PATENT DOCUMENTS

2018/0046855 A1* 2/2018 Ganong .............. G06K 9/00248
2018/0276452 A1* 9/2018 Kase .................. G06K 9/00281

FOREIGN PATENT DOCUMENTS

CN    105518709 A    4/2016
CN    107491674 A    12/2017
(Continued)

OTHER PUBLICATIONS

International Search Report and Written Opinion dated Nov. 19, 2019, in counterpart International Application No. PCT/US2019/049676.

(Continued)

*Primary Examiner* — Huan V Doan
(74) *Attorney, Agent, or Firm* — Finnegan, Henderson, Farabow, Garrett & Dunner, L.L.P.

(57) ABSTRACT

An authentication method includes: acquiring a front face feature and a side face feature of a first user in response to a face authentication request of the first user; searching, based on the front face feature and the side face feature of the first user, a first list of users of multiple births corresponding to the first user for a candidate user matching both the front face feature and the side face feature of the first user, wherein the first list of users of multiple births corresponding to the first user is a list of users of multiple births with similar front face features and non-similar side face features; and determining, based on consistency between the candidate user and the first user in the front face feature and the side face feature, whether the first user succeeds in authentication.

20 Claims, 8 Drawing Sheets

(56) References Cited

FOREIGN PATENT DOCUMENTS

| | | |
|---|---|---|
| CN | 107622227 A | 1/2018 |
| CN | 108491806 A | 9/2018 |
| EP | 3 067 829 A1 | 9/2016 |

OTHER PUBLICATIONS

Jain et al., "50 years of biometric research: Accomplishments, challenges, and opportunities," Pattern Recognition Letters (2016), 79:80-105.
Ghoualmi et al., "A SIFT-Based Feature Level Fusion of Iris and Ear Biometrics," Springer International (2015), pp. 102-112.

\* cited by examiner

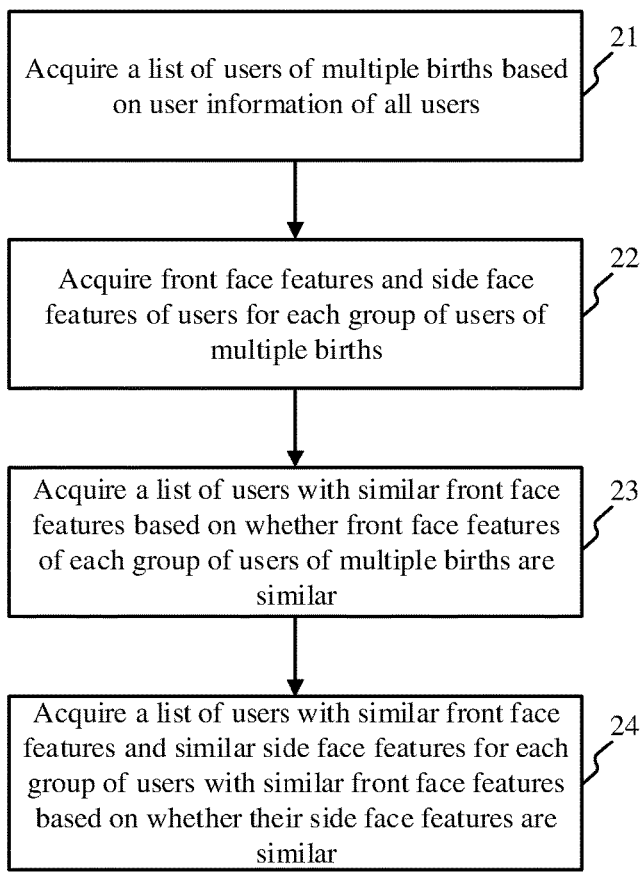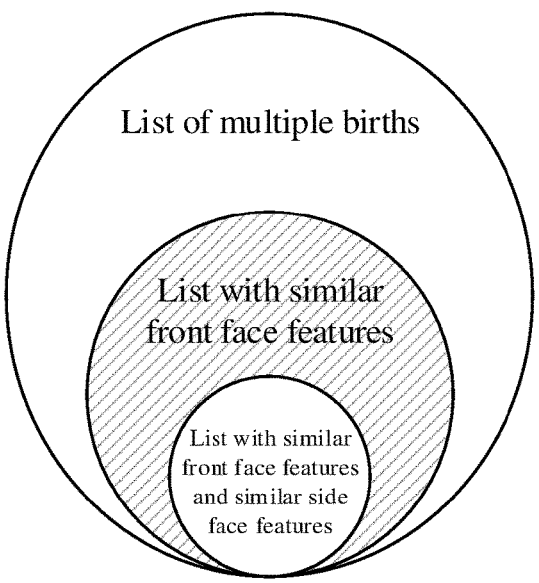
FIG. 2(a)
FIG. 2(b)

AUTHENTICATION AND AUTHENTICATION MODE DETERMINATION METHOD, APPARATUS, AND ELECTRONIC DEVICE

CROSS-REFERENCE TO RELATED APPLICATIONS

This application is based upon and claims priority to Chinese Patent Application No. 201811050088.2, filed on Sep. 10, 2018, the entire content of all of which is incorporated herein by reference.

TECHNICAL FIELD

This application relates to the field of computer technologies, and in particular, to an authentication and authentication mode determination method, apparatus and electronic device.

BACKGROUND

With the continuous development of pattern recognition and artificial intelligence technologies, the face recognition technology has been more and more widely applied. At present, face scan payment based on the face recognition technology has been gradually applied to people's daily life.

Face scan payment can use a human face feature as a password, thus eliminating the need for manually inputting a password and greatly simplifying an electronic payment process of a user. However, for users of multiple births, due to the great similarity of their face features, it may be difficult for face scan payment to simply carry out identity recognition based on face features. Multiple births include two or more persons born in one pregnancy such as twins and triplets.

Therefore, when users of multiple births use face scan payment, it may still be necessary to provide a further solution for how to identify such users.

SUMMARY

Embodiments of the specification provide an authentication and authentication mode determination method, apparatus and electronic device.

In a first aspect, an authentication method comprises: acquiring a front face feature and a side face feature of a first user in response to a face authentication request of the first user; searching, based on the front face feature and the side face feature of the first user, a first list of users of multiple births corresponding to the first user for a candidate user matching both the front face feature and the side face feature of the first user, wherein the first list of users of multiple births corresponding to the first user is a list of users of multiple births with similar front face features and non-similar side face features; and determining, based on consistency between the candidate user and the first user in the front face feature and the side face feature, whether the first user succeeds in authentication.

In a second aspect, an electronic device comprises: a processor; and a memory storing instructions executable by the processor, wherein the processor is configured to: acquire a front face feature and a side face feature of a first user in response to a face authentication request of the first user; search, based on the front face feature and the side face feature of the first user, a first list of users of multiple births corresponding to the first user for a candidate user matching both the front face feature and the side face feature of the first user, wherein the first list of users of multiple births corresponding to the first user is a list of users of multiple births with similar front face features and non-similar side face features; and determining, based on consistency between the candidate user and the first user in the front face feature and the side face feature, whether the first user succeeds in authentication.

In a third aspect, a non-transitory computer-readable storage medium has stored thereon instructions that, when executed by a processor of an electronic device, cause the electronic device to perform an authentication method, the method comprising: acquiring a front face feature and a side face feature of a first user in response to a face authentication request of the first user; searching, based on the front face feature and the side face feature of the first user, a first list of users of multiple births corresponding to the first user for a candidate user matching both the front face feature and the side face feature of the first user, wherein the first list of users of multiple births corresponding to the first user is a list of users of multiple births with similar front face features and non-similar side face features; and determining, based on consistency between the candidate user and the first user in the front face feature and the side face feature, whether the first user succeeds in authentication.

The technical solutions in the embodiments of this specification can achieve at least the following technical effects.

A front face feature and a side face feature of a user are acquired in response to a face authentication request of the user, then a list of users of multiple births corresponding to the user is searched, based on the front face feature and the side face feature of the user, for a candidate user matching both the front face feature and the side face feature of the user, wherein the list of users of multiple births corresponding to the user is a list of users of multiple births with similar front face features and non-similar side face features, and finally, it can be determined, based on consistency between the candidate user and the user in the front face feature and the side face feature, whether the user succeeds in the authentication. As such, when the authenticated user is a user of multiple births, the front face feature and the side face feature of the user can be acquired and then compared with front face features and side face features of users in the pre-established list of users of multiple births to determine whether the user succeeds in the authentication, thus solving the problem of identifying using face features of a user of multiple births in the prior art.

In addition, in some embodiments, user information of a user is acquired in response to a request for activating a face authentication mode from the user, and then an authentication mode is determined for the user based on first user information with similar front face features and second user information with similar front face features and similar side face features in a list of users of multiple births, and the user information of the user. As such, when the user to activate the face authentication mode is a user of multiple births, a specific authentication mode can be determined for the user by determining whether the user is a user only with a similar front face feature in the list of users of multiple births, a user with both a similar front face feature and a similar side face feature in the list of users of multiple births, or a user with a non-similar front face feature in the list of users of multiple births, so that some users in the list of users of multiple births can also activate a face authentication mode.

BRIEF DESCRIPTION OF THE DRAWINGS

The accompanying drawings are incorporated into the specification, and together with the description, illustrate embodiments and explain the principle disclosed in the specification.

FIGS. 2(*a*) and 2(*b*) are schematic diagrams of a construction process of a list of users of multiple births according to an embodiment.

DETAILED DESCRIPTION

Embodiments of the specification will be described below with reference to the accompanying drawings. The embodiments described are merely examples, rather than all the embodiments consistent with the specification. All other embodiments obtained by those of ordinary skill in the art based on the described embodiments without creative efforts are encompassed in the protection scope of this application.

In order to solve the problem in the prior art that users of multiple births may not be identified based on face features, an authentication method and an authentication mode determination method are provided in the embodiments of this specification. The method provided in the embodiments of this specification may be executed by, but not limited to, a user terminal, such as s mobile phone, a tablet computer, and a personal computer.

Figure 1:
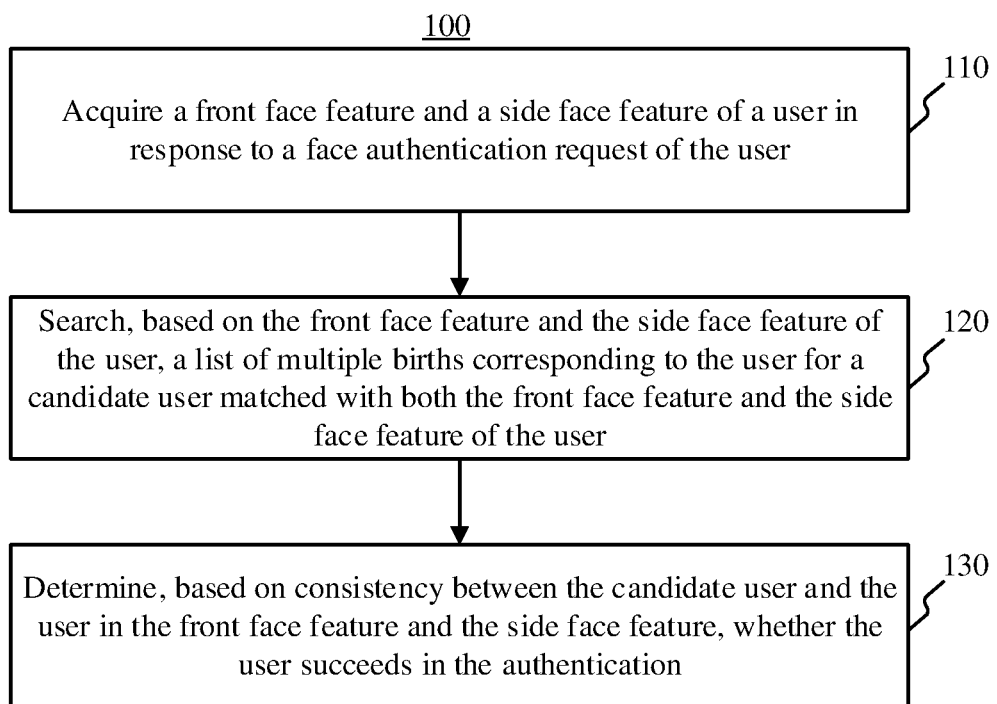
FIG. 1 is a flow chart of an authentication method according to an embodiment.

FIG. 1 is a flow chart of an authentication method 100 according to an embodiment. For example, the method 100 may be performed by a terminal device, and include the following steps.

In step 110, a front face feature and a side face feature of a user are acquired in response to a face authentication request of the user.

In an embodiment, acquiring a front face feature and a side face feature of a user can specifically be: first determining whether the user is included in a list of users of multiple births with similar front face features; and then acquiring the front face feature and the side face feature of the user if it is determined that the user is included in the list of users of multiple births with similar front face features.

It should be appreciated that the multiple births in the embodiment include two or more persons born in one pregnancy, for example, twins, triplets, quadruplets, and so on. The multiple births mentioned below in other embodiments are similar to this, and will not be described in detail.

In the embodiment, as users in the list of users of multiple births may not have the same front face features, for example, there are some differences in face features between fraternal twins, it can be determined whether the user is included in the list of users of multiple births with similar front face features, and the front face feature and the side face feature of the user are acquired when it is determined that the user is included in the list of users of multiple births with similar front face features.

In an embodiment, whether the user is included in the list of users of multiple births can be determined by acquiring a user ID and determining whether the user ID is included in the list of users of multiple births. The user information included in the list of users of multiple births can include user IDs, and each user ID corresponds to a unique user. In other words, the user ID is unique identification information of the user.

For users of multiple births, the similarity of their face features is often high. If face authentication is performed on the users with high similarity of face features, the result of authentication may be inaccurate. When the users with high similarity of face features, such as twins, want to activate or use a face authentication function, they may be prompted to use another authentication mode.

However, although the problem of the inaccurate result of authentication caused when the users use face authentication is avoided by forbidding the users with high similarity of face features from using the face authentication function, some inconveniences may be brought about to the users. That is, when the users perform operations requiring authentication such as payment, they may need to perform authentication through some relatively cumbersome operations, such as entering a password. In one or more embodiments of this specification, in order to solve this problem to enable users of multiple births to also use a face authentication mode, a list of users of multiple births is constructed in advance based on user information and similarities in face features of all users.

FIG. 2(*a*) is a flow chart of a method 200 for constructing a list of users of multiple births according to an embodiment Referring to FIG. 2(*a*), the method 200 includes the following steps.

In step 21, a list of users of multiple births is acquired based on user information of all users.

By taking a payment application for payment as an example, user information of all users using the payment application, such as date of birth, registered permanent residence, residence and other information, can be acquired in advance to determine which users in all the users using the payment application are users of multiple births, thus acquiring a list of users of multiple births. As shown in FIG. 2(*b*), the circle with the largest range in FIG. 2(*b*) represents the list of users of multiple births acquired.

In step 22, front face features and side face features of users are acquired for each group of users of multiple births on the list.

By continuing to take the foregoing payment application as an example, in order to improve the level of information security, avatar information of a user can be collected when the user registers the payment application. For example, a front face image and a side face image of the user are acquired, and then a front face feature and a side face feature of the user are acquired based on the front face image and the side face image of the user.

In step 23, a list of users with similar front face features is acquired based on whether front face features of each group of users of multiple births are similar.

For example, the list of users with similar front face features is determined from the list of users of multiple births by collecting front face features of the users in the list of users of multiple births for comparison. As shown in FIG. 2(*b*), the list of users with similar front face features is acquired based on the list of users of multiple births, and thus is included in the range of the list of users of multiple births.

In step 24, a list of users with similar front face features and similar side face features is acquired for each group of users with similar front face features based on whether their side face features are similar.

In the embodiment, for each group of users with similar front face features, a list of users with similar front face features and similar side face features can be acquired by collecting side face features of the users for comparison and determining whether side face features of the users with similar front face features are also similar. As shown in FIG. 2(b), the list of users with similar front face features and similar side face features is acquired based on the list of users with similar front face features, and thus is included in the range of the list of users with similar front faces.

Referring back to FIG. 1, in step 120, a list of users of multiple births corresponding to the user is searched, based on the front face feature and the side face feature of the user, for a candidate user matching both the front face feature and the side face feature of the user.

The list of users of multiple births corresponding to the user is a list of users of multiple births with similar front face features and non-similar side face features, that is, the list of users of multiple births corresponding to the shaded area shown in FIG. 2(b).

In step 130, it is determined, based on consistency between the candidate user and the user in the front face feature and the side face feature, whether the user succeeds in the authentication.

In an embodiment, the determining, based on consistency between the candidate user and the user in the front face feature and the side face feature, whether the user succeeds in the authentication includes the following two situations: 1. determining that the user succeeds in the authentication if the candidate user is consistent with the user in both the front face feature and the side face feature, and 2. determining that the user fails in the authentication if the candidate user is inconsistent with the user in the front face feature or the side face feature.

In the embodiment, a front face feature and a side face feature of a user are acquired in response to a face authentication request of the user, then a list of users of multiple births corresponding to the user is searched, based on the front face feature and the side face feature of the user, for a candidate user matching both the front face feature and the side face feature of the user, wherein the list of users of multiple births corresponding to the user is a list of users of multiple births with similar front face features and non-similar side face features, and finally, it can be determined, based on consistency between the candidate user and the user in the front face feature and the side face feature, whether the user succeeds in the authentication. As such, when the authenticated user is a user of multiple births, the front face feature and the side face feature of the user can be acquired and then compared with front face features and side face features of users in the pre-established list of users of multiple births to determine whether the user succeeds in the authentication, thus solving the problem of identifying using face features of a user of multiple births in the prior art.

Figure 3:
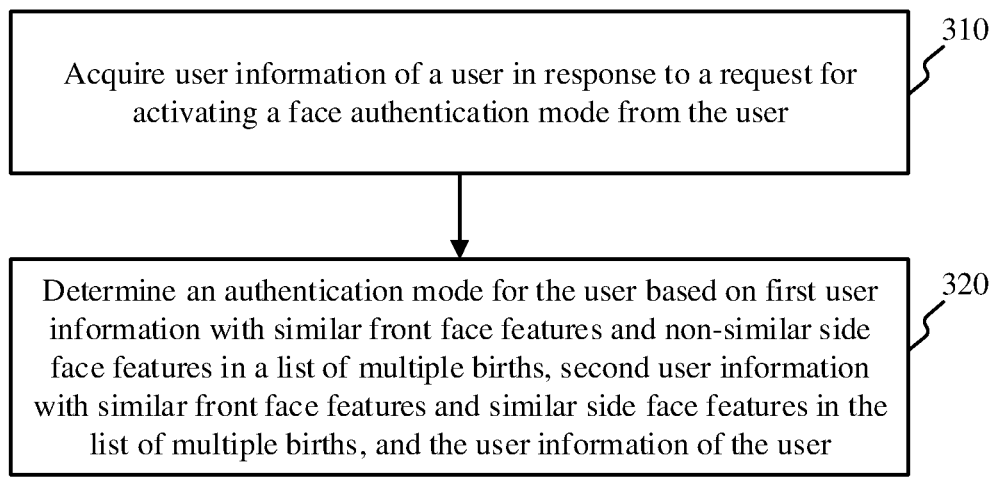
FIG. 3 is a flow chart of an authentication mode determination method according to an embodiment.

An authentication mode determination method is further provided in an embodiment of this specification. FIG. 3 is a flow chart of an authentication mode determination method 300 according to an embodiment. The method 300 includes the following steps.

In step 310, user information of a user is acquired in response to a request for activating a face authentication mode from the user.

In the embodiment, if a request for activating a face authentication mode is received from a user, user information of the user is acquired in response to the request for activating a face authentication mode from the user. The user information of the user may specifically be an ID of the user. i.e., the unique identification information of the user as described above.

In step 320, an authentication mode is determined for the user based on first user information with similar front face features and non-similar side face features in a list of users of multiple births, second user information with similar front face features and similar side face features in the list of users of multiple births, and the user information of the user.

In an embodiment, the determining an authentication mode for the user based on the first user information with similar front face features and non-similar side face features in the list of users of multiple births, the second user information with similar front face features and similar side face features in the list of users of multiple births, and the user information of the user includes the following situations.

In Situation i, a front face feature and a side face feature of the user are acquired if the user information of the user is included in the first user information; and an authentication mode is determined for the user based on the front face feature and the side face feature of the user. As the first user information corresponds to similar front face features and non-similar side face features in the list of users of multiple births, i.e., the user information corresponding to the shaded area shown in FIG. 2(b), the front face feature and the side face feature of the user may be collected as comparison features for performing face authentication on the user. When face authentication is performed on the user, a front face picture and a side face picture of the user may be collected at the same time, and the front face feature and the side face feature corresponding to the front face picture and the side face picture collected when face authentication is performed on the user are compared with the front face feature and the side face feature of the user collected when the user activates the face authentication mode, and it is determined based on a comparison result whether the user succeeds in the authentication.

In Situation ii, a front face feature of the user is acquired if the user information of the user is not included in the first user information; and the authentication mode is determined for the user based on the front face feature of the user. In this situation, if the user information of the user is not included in the first user information, it can be determined that the user information of the user is not included in the second user information, either. In other words, the user does not belong to the users with similar front face features. Therefore, when the user activates the face authentication mode on a terminal device, the terminal device can collect only a front face feature of the user as a comparison feature for performing face authentication on the user. Then, when face authentication is performed on the user, the terminal device can collect a front face picture of the user, compare a front face feature corresponding to the front face picture collected when face authentication is performed on the user with the front face feature collected when the user activates the authentication mode, and determine based on a comparison result whether the user succeeds in the authentication.

In Situation iii, the user is prompted to activate an authentication mode other than the face authentication mode, if the user information of the user is included in the second user information. If the user information of the user is included in the second user information, it indicates that the user is included in the list of users of multiple births with similar front face features and similar side face features. In this situation, in order to improve the accuracy of the authentication result and ensure the security of the user information, the user can be prompted to activate another authentication mode, i.e., an authentication mode other than the face authentication mode, such as fingerprint recognition, password verification, and SMS verification code.

Figure 4:
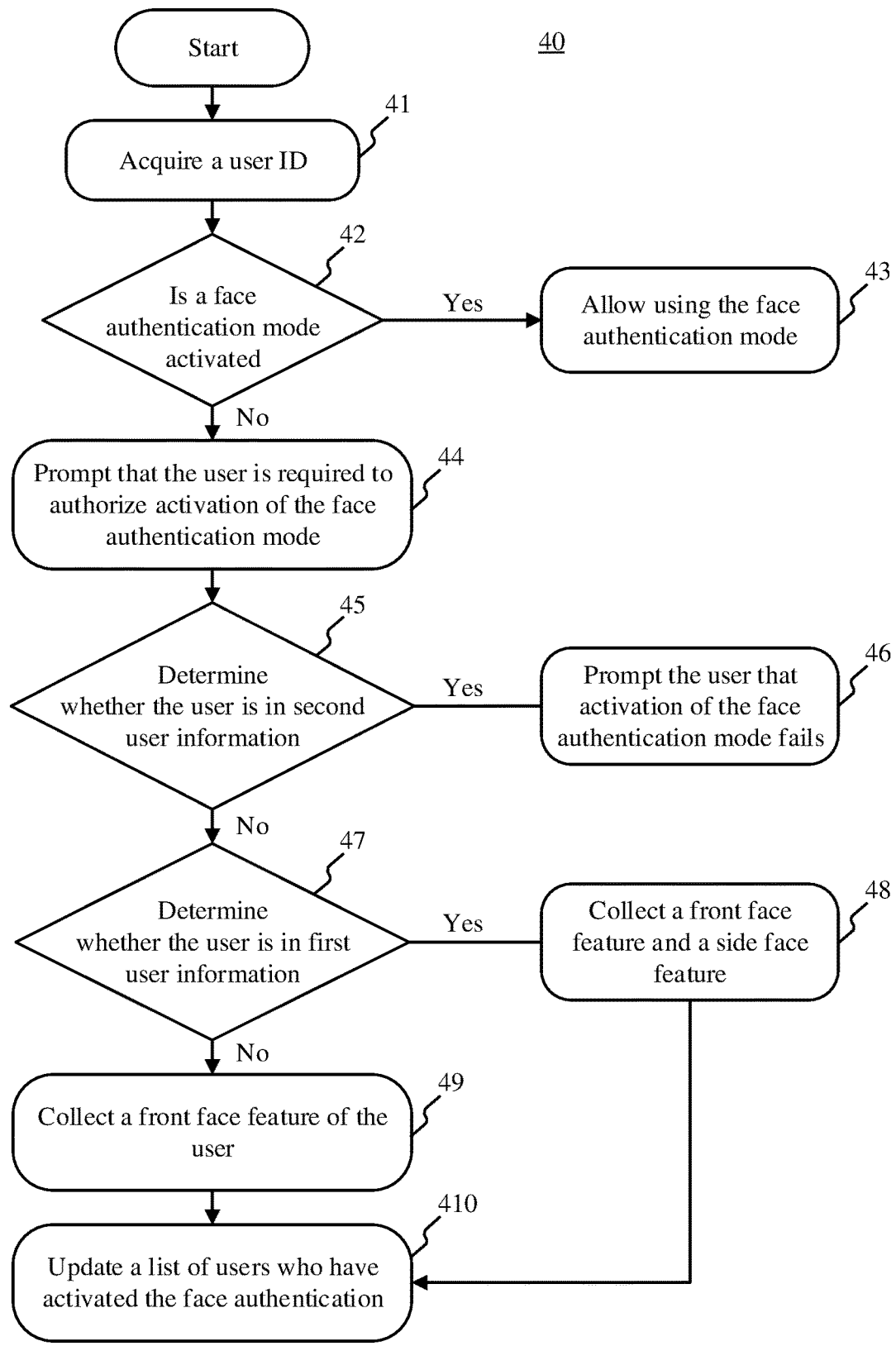
FIG. 4 is a flow chart of an authentication mode determination method according to an embodiment.

FIG. 4 is a flow chart of an authentication mode determination method 40 according to an embodiment. For example, the method 40 may be performed by a terminal device. As shown in FIG. 4, the method 400 includes the following steps.

In step 41, a user ID is acquired in response to a request for activating a face authentication mode from the user.

In step 42, it is determined based on the user ID whether the user has activated the face authentication mode, and if it is determined that the user has activated the face authentication mode, step 43 is performed.

In step 43, if it is determined that the user has activated the face authentication mode, the user is allowed to directly use the face authentication mode.

In step 44, if it is determined that the user has not activated the face authentication mode, it is prompted that the user is required to authorize activation of the face authentication mode.

In step 45, it is determined whether the user is included in the second user information described above, if it is determined that the user is included in the second user information, step 46 is performed, and if it is determined that the user is not included in the second user information, step 47 is performed.

In step 46, if it is determined that the user is included in the second user information, the user is prompted that activation of the face authentication mode fails.

In this case, in order to protect the security of user information and improve the accuracy of the authentication result, the user can be prompted to use another authentication mode, that is, an authentication mode other than the face authentication mode.

In step 47, if it is determined that the user is not included in the second user information, it is determined whether the user is included in the first user information described above.

In step 48, if it is determined that the user is included in the first user information, a front face feature and a side face feature of the user are collected, and the authentication mode is determined for the user based on the front face feature and the side face feature of the user.

That is, the front face feature and the side face feature of the user are collected as comparison features of the face authentication mode of the user. When face authentication is performed on the user, a front face picture and a side face picture of the user are collected, a front face feature and a side face feature corresponding to the front face picture and the side face picture are extracted and compared with the front face feature and the side face feature collected when the user activates the face authentication mode, if the comparison is successful, the user succeeds in the face authentication, and if the comparison is not successful, the user fails in the face authentication.

In step 49, a front face feature of the user is collected if the user information of the user is not included in the first user information; and the authentication mode is determined for the user based on the front face feature of the user.

In this situation, the terminal device can only collect the front face feature of the user. When face authentication is performed on the user, the terminal device can only collect a front face picture of the user, extract a front face feature corresponding to the front face picture and compare the front face feature with the front face feature collected when the user activates the face authentication mode. If the comparison is successful, the user succeeds in the face authentication, and if the comparison is not successful, the user fails in the face authentication.

In step 410, a list of users who have activated the face authentication mode is updated.

In the embodiment, user information of a user is acquired in response to a request for activating a face authentication mode from the user, and then an authentication mode is determined for the user based on first user information with similar front face features in a list of users of multiple births, second user information with similar front face features and similar side face features in the list of users of multiple births, and the user information of the user. As such, when the user to activate the face authentication mode is a user of multiple births, a specific authentication mode can be determined for the user by determining whether the user is a user only with a similar front face feature in the list of users of multiple births, a user with both a similar front face feature and a similar side face feature in the list of users of multiple births, or a user with a non-similar front face feature in the list of users of multiple births, so that some users in the list can also activate the face authentication mode.

Figure 5:
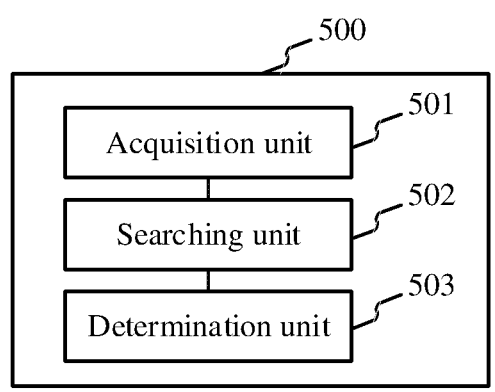
FIG. 5 is a schematic diagram of an authentication apparatus according to an embodiment.

FIG. 5 is a schematic diagram of an authentication apparatus 500 according to an embodiment. Referring to FIG. 5, the authentication apparatus 500 can include an acquisition unit 501, a searching unit 502, and a determination unit 503.

The acquisition unit 501 is configured to acquire a front face feature and a side face feature of a user in response to a face authentication request of the user.

The searching unit 502 is configured to search, based on the front face feature and the side face feature of the user, a list of users of multiple births corresponding to the user for a candidate user matching both the front face feature and the side face feature of the user, wherein the list of users of multiple births corresponding to the user is a list of users of multiple births with similar front face features and non-similar side face features.

The determination unit 503 is configured to determine, based on consistency between the candidate user and the user in the front face feature and the side face feature, whether the user succeeds in the authentication.

In an embodiment, the acquisition unit 501 is configured to: determine whether the user is included in a list of users of multiple births with similar front faces; and acquire the front face feature and the side face feature of the user if the user is included in the list of users of multiple births with similar front face features.

In an embodiment, the determination unit 503 is configured to: determine that the user succeeds in the authentication if the candidate user is consistent with the user in both the front face feature and the side face feature; and determine that the user fails in the authentication if the candidate user is inconsistent with the user in the front face feature or the side face feature.

The authentication apparatus 500 can implement the method in the method embodiment of FIG. 1 and FIGS. 2(a) and 2(b). Reference can be made to the authentication method in the embodiments of FIG. 1 and FIGS. 2(a) and (2b) for detail.

Figure 6:
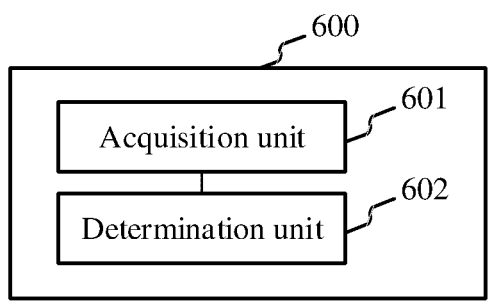
FIG. 6 is a schematic diagram of an authentication mode determination apparatus according to an embodiment.

FIG. 6 is a schematic diagram of an authentication mode determination apparatus 600 according to an embodiment. Referring to FIG. 6, the authentication mode determination apparatus 600 can include an acquisition unit 601 and a determination unit 602.

The acquisition unit 601 is configured to acquire user information of a user in response to a request for activating a face authentication mode from the user.

The determination unit 602 is configured to determine an authentication mode for the user based on first user information with similar front face features and non-similar side face features in a list of users of multiple births, second user information with similar front face features and similar side face features in the list of users of multiple births, and the user information of the user.

In an embodiment, the determination unit 602 is configured to: acquire a front face feature and a side face feature of the user if the user information of the user is included in the first user information; and determine the authentication mode for the user based on the front face feature and the side face feature of the user.

In an embodiment, the determination unit 602 is configured to: acquire a front face feature of the user if the user information of the user is not included in the first user information; and determine the authentication mode for the user based on the front face feature of the user.

In an embodiment, the determination unit 602 is configured to: prompt the user to activate an authentication mode other than the face authentication mode if the user information of the user is included in the second user information.

The authentication mode determination apparatus 600 can implement the method in the method embodiment of FIG. 3 and FIG. 4. Reference can be made to the authentication mode determination method in the embodiments shown in FIG. 3 and FIG. 4 for detail.

Figure 7:
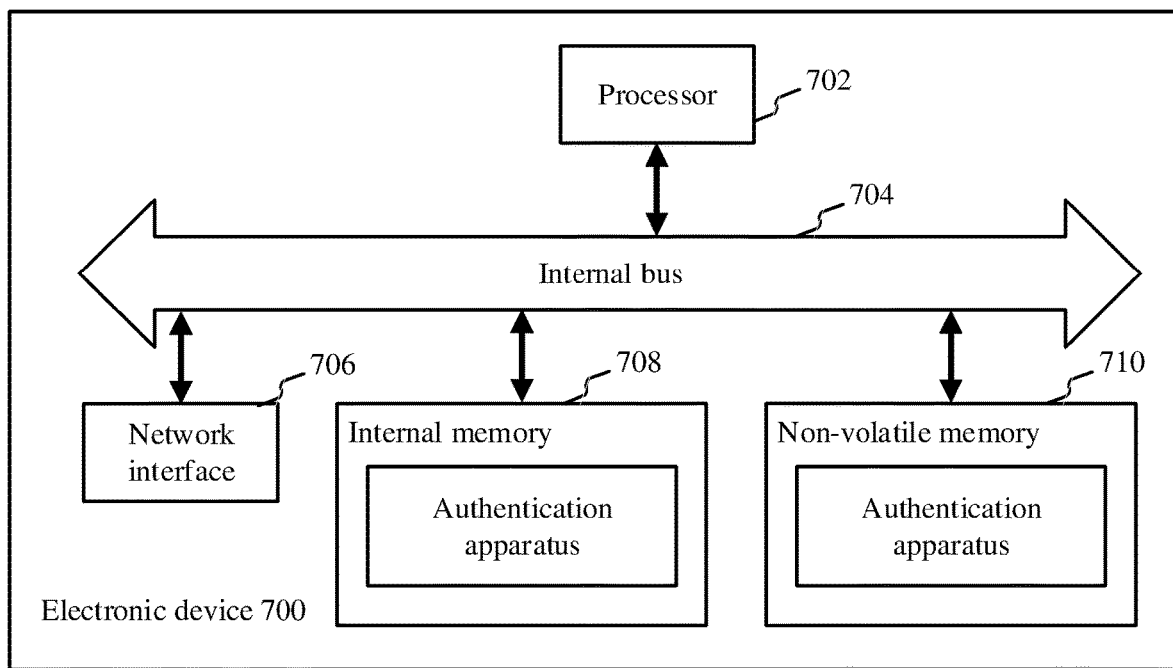
FIG. 7 is a schematic diagram of an electronic device according to an embodiment.

FIG. 7 is a schematic diagram of an electronic device 700 according to an embodiment. Referring to FIG. 7, the electronic device 700 includes a processor 702, and optionally further includes an internal bus 704, a network interface 706, and a memory. The memory may include an internal memory 708 such as a high-speed Random-Access Memory (RAM), or may further include a non-volatile memory 710 such as at least one magnetic disk memory. The electronic device 700 may further include hardware required by other services.

The processor 702, the network interface 706, and the memory 708 and 710 may be interconnected through the internal bus 704, and the internal bus 704 may be an Industry Standard Architecture (ISA) bus, a Peripheral Component Interconnect (PCI) bus, an Extended Industry Standard Architecture (EISA) bus, or the like. The internal bus 704 may be an address bus, a data bus, a control bus, and the like. For ease of representation, only one double-sided arrow is shown in FIG. 7 to represent the internal bus 704, but it does not mean that there is only one bus or one type of buses.

The memory is configured to store a program. The program may include program codes including a computer operation instruction. The memory may include the internal memory 708 and the non-volatile memory 710, and provides an instruction and data to the processor 702.

The processor 702 reads, from the non-volatile memory 710, the corresponding computer program into the internal memory 708 and runs the computer program to perform the above described authentication method (FIGS. 1, 2(*a*), and 2(*b*)), thus forming an authentication apparatus at the logic level. The processor 702 executes the program stored in the memory 708 and 710, and is configured to perform the following operations: acquiring a front face feature and a side face feature of a user in response to a face authentication request of the user: searching, based on the front face feature and the side face feature of the user, a list of users of multiple births corresponding to the user for a candidate user matching both the front face feature and the side face feature of the user, wherein the list of users of multiple births corresponding to the user is a list of users of multiple births with similar front face features and non-similar side face features; and determining, based on consistency between the candidate user and the user in the front face feature and the side face feature, whether the user succeeds in the authentication.

The processor 702 may be an integrated circuit chip having a signal processing capability. In the process of implementation, various steps of the above method may be completed by an integrated logic circuit of hardware in the processor 702 or an instruction in the form of software. The processor 702 may be a general-purpose processor, including a Central Processing Unit (CPU), a Network Processor (NP), etc.; or may be a Digital Signal Processor (DSP), an Application Specific Integrated Circuit (ASIC), a Field-Programmable Gate Array (FPGA) or another programmable logic device, discrete gate or transistor logic device, or discrete hardware component. The methods, steps, and logical block diagrams disclosed in the embodiments of this specification can be implemented or performed. The general-purpose processor may be a microprocessor, or the processor may be any conventional processor or the like. The steps of the method disclosed in one or more embodiments of this specification may be directly performed by a hardware decoding processor, or may be performed by a combination of hardware and software modules in the decoding processor. The software module can be located in a mature storage medium in the field, such as a random-access memory, a flash memory, a read-only memory, a programmable read-only memory or an electrically erasable programmable memory, and a register. The storage medium is located in the memory, and the processor reads the information in the memory and implements the steps of the above method in combination with its hardware.

Figure 8:
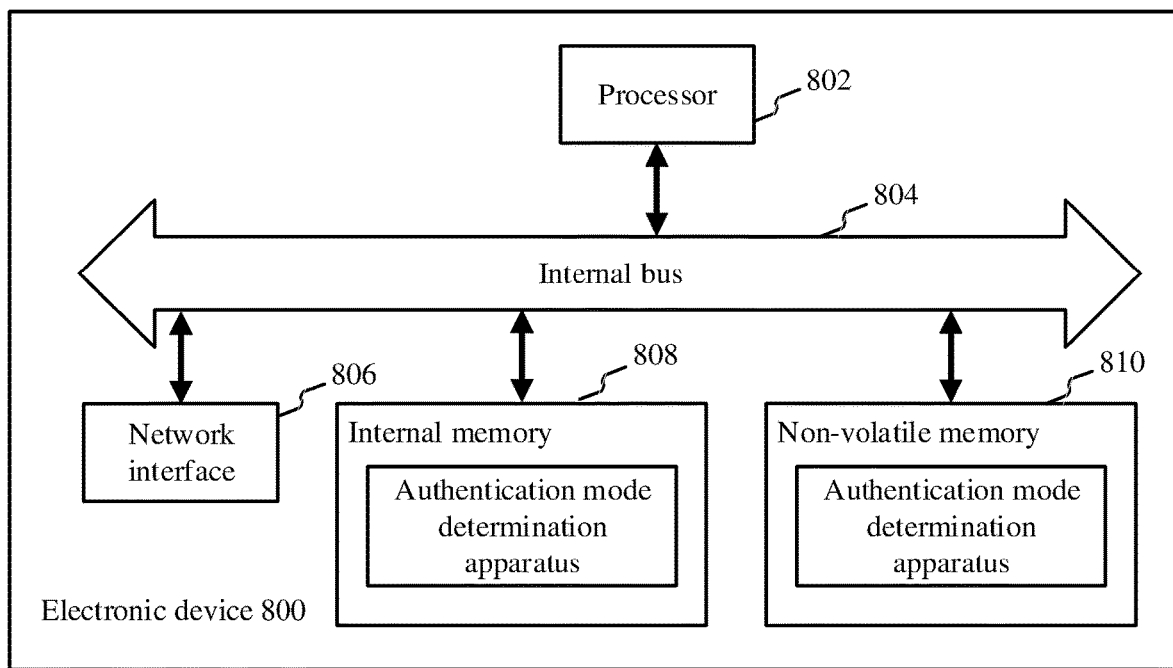
FIG. 8 is a schematic diagram of another electronic device according to an embodiment.

FIG. 8 is a schematic diagram of an electronic device 800 according to an embodiment. Referring to FIG. 8, the electronic device 800 includes a processor 802, and optionally further includes an internal bus 804, a network interface 806, and a memory. The memory may include an internal memory 808 such as a high-speed Random-Access Memory (RAM), or may further include a non-volatile memory 810 such as at least one magnetic disk memory. The electronic device 800 may further include hardware required by other services.

The processor 802, the network interface 806, and the memory 808 and 810 may be interconnected through the internal bus 804, and the internal bus 804 may be an Industry Standard Architecture (ISA) bus, a Peripheral Component Interconnect (PCI) bus, an Extended Industry Standard Architecture (EISA) bus, or the like. The internal bus 804 may be an address bus, a data bus, a control bus, and the like. For ease of representation, only one double-sided arrow is shown in FIG. 8 to represent the internal bus 804, but it does not mean that there is only one bus or one type of buses.

The memory is configured to store a program. The program may include program codes including a computer operation instruction. The memory may include the internal memory 808 and the non-volatile memory 810, and provides an instruction and data to the processor 802.

The processor 802 reads, from the non-volatile memory 810, the corresponding computer program into the internal memory 808 and runs the computer program to perform the above described authentication mode determination method (FIGS. 3 and 4), thus forming an authentication mode determination apparatus at the logic level. The processor 802 executes the program stored in the memory 808 and 810, and is configured to perform the following operations: acquiring user information of a user in response to a request for activating a face authentication mode from the user; and determining an authentication mode for the user based on first user information with similar front face features and non-similar side face features in a list of users of multiple births, second user information with similar front face features and similar side face features in the list of users of multiple births, and the user information of the user.

The processor 802 may be an integrated circuit chip having a signal processing capability. In the process of implementation, various steps of the above method may be completed by an integrated logic circuit of hardware in the processor 802 or an instruction in the form of software. The processor 802 may be a general-purpose processor, including a Central Processing Unit (CPU), a Network Processor (NP), etc.; or may be a Digital Signal Processor (DSP), an Application Specific Integrated Circuit (ASIC), a Field-Programmable Gate Array (FPGA) or another programmable logic device, discrete gate or transistor logic device, or discrete hardware component. The methods, steps, and logical block diagrams disclosed in the embodiments of this specification can be implemented or performed. The general-purpose processor may be a microprocessor, or the processor may be any conventional processor or the like. The steps of the method disclosed in one or more embodiments of this application may be directly performed by a hardware decoding processor, or may be performed by a combination of hardware and software modules in the decoding processor. The software module can be located in a mature storage medium in the field, such as a random-access memory, a flash memory, a read-only memory, a programmable read-only memory or an electrically erasable programmable memory, and a register. The storage medium is located in the memory, and the processor reads the information in the memory and implements the steps of the above method in combination with its hardware.

The above description is merely example embodiments of this specification, and is not intended to limit the protection scope of this specification. Any modification, equivalent replacement, improvement and the like made within the spirit and principle of one or more embodiments of this specification should be included in the protection scope of this specification.

The system, apparatus, module or unit illustrated in the above embodiments may be implemented by a computer chip or an entity, or by a product having a certain function. A typical implementation device is a computer. For example, the computer may be a personal computer, a laptop computer, a cellular phone, a camera phone, a smart phone, a personal digital assistant, a media player, a navigation device, an email device, a game console, a tablet computer, a wearable device, or a combination of any of these devices.

The computer readable medium includes non-volatile and volatile media as well as movable and non-movable media, and may implement information storage by means of any method or technology. The information may be a computer readable instruction, a data structure, and a module of a program or other data. Examples of the storage medium of a computer include, but are not limited to, a phase change memory (PRAM), a static random access memory (SRAM), a dynamic random access memory (DRAM), other types of RAMs, a ROM, an electrically erasable programmable read-only memory (EEPROM), a flash memory or other memory technologies, a compact disk read-only memory (CD-ROM), a digital versatile disc (DVD) or other optical storages, a cassette tape, a magnetic tape/magnetic disk storage or other magnetic storage devices, or any other non-transmission medium, and can be used to store information accessible to a computing device. The computer readable medium does not include transitory media, such as a modulated data signal and a carrier.

It should be further noted that the terms "include," "comprise" or other variations thereof are intended to cover non-exclusive inclusion, so that a process, method, article or device including a series of elements not only includes the elements, but also includes other elements not expressly listed, or further includes elements inherent to the process, method, article or device. In the absence of more limitations, an element defined by "including a/an . . . " does not exclude that the process, method, article or device including the element further has other identical elements.

Various embodiments in this specification are described progressively. The same or similar parts between the embodiments may be referenced to one another. In each embodiment, the focus of description is on the part that is different from other embodiment. Particularly, the system embodiment is described in a relatively simple manner because it is similar to the method embodiment, and for related parts, reference can be made to the parts described in the method embodiment.

The invention claimed is:

1. An authentication method, comprising:
   acquiring a front face feature and a side face feature of a first user in response to a face authentication request of the first user;
   searching, based on the front face feature and the side face feature of the first user, a first list of users of multiple births corresponding to the first user for a candidate user matching both the front face feature and the side face feature of the first user, wherein the first list of users of multiple births corresponding to the first user is a list of users of multiple births with similar front face features and non-similar side face features; and
   determining, based on consistency between the candidate user and the first user in the front face feature and the side face feature, whether the first user succeeds in authentication.

2. The method of claim 1, wherein the acquiring a front face feature and a side face feature of a first user comprises:
   determining whether the first user is included in a second list of users of multiple births with similar front face features; and
   acquiring the front face feature and the side face feature of the first user if it is determined that the first user is included in the second list of users of multiple births with similar front face features.

3. The method of claim 1, wherein the determining, based on consistency between the candidate user and the first user in the front face feature and the side face feature, whether the first user succeeds in the authentication comprises:
   determining that the first user succeeds in the authentication if the candidate user is consistent with the first user in both the front face feature and the side face feature; and
   determining that the first user fails in the authentication if the candidate user is inconsistent with the first user in the front face feature or the side face feature.

4. The method of claim 1, further comprising:
   acquiring user information of a second user in response to a request for activating a face authentication mode from the second user; and
   determining an authentication mode for the second user based on first user information of users with similar front face features and non-similar side face features in a second list of users of multiple births, second user information of users with similar front face features and similar side face features in the second list of users of multiple births, and the user information of the second user.

5. The method of claim 4, wherein the determining an authentication mode for the second user further comprises:
acquiring a front face feature and a side face feature of the second user if the user information of the second user is included in the first user information; and
determining the authentication mode for the second user based on the front face feature and the side face feature of the second user.

6. The method of claim 4, wherein the determining an authentication mode for the second user comprises:
acquiring a front face feature of the second user if the user information of the second user is not included in the first user information; and
determining the authentication mode for the second user based on the front face feature of the second user.

7. The method of claim 4, wherein the determining an authentication mode for the second user comprises:
prompting the second user to activate an authentication mode other than a face authentication mode, if the user information of the second user is included in the second user information.

8. An electronic device, comprising:
a processor; and
a memory storing instructions executable by the processor;
wherein the processor is configured to:
acquire a front face feature and a side face feature of a first user in response to a face authentication request of the first user;
search, based on the front face feature and the side face feature of the first user, a first list of users of multiple births corresponding to the first user for a candidate user matching both the front face feature and the side face feature of the first user, wherein the first list of users of multiple births corresponding to the first user is a list of users of multiple births with similar front face features and non-similar side face features; and
determine, based on consistency between the candidate user and the first user in the front face feature and the side face feature, whether the first user succeeds in authentication.

9. The electronic device of claim 8, wherein in acquiring the front face feature and the side face feature of the first user, the processor is further configured to:
determine whether the first user is included in a second list of users of multiple births with similar front face features; and
acquire the front face feature and the side face feature of the first user if it is determined that the first user is included in the second list of users of multiple births with similar front face features.

10. The electronic device of claim 8, wherein in determining, based on consistency between the candidate user and the first user in the front face feature and the side face feature, whether the first user succeeds in the authentication, the processor is further configured to:
determine that the first user succeeds in the authentication if the candidate user is consistent with the first user in both the front face feature and the side face feature; and
determine that the first user fails in the authentication if the candidate user is inconsistent with the first user in the front face feature or the side face feature.

11. The electronic device of claim 8, wherein the processor is further configured to:
acquire user information of a second user in response to a request for activating a face authentication mode from the second user; and
determine an authentication mode for the second user based on first user information of users with similar front face features and non-similar side face features in a second list of users of multiple births, second user information of users with similar front face features and similar side face features in the second list of users of multiple births, and the user information of the second user.

12. The electronic device of claim 11, wherein in determining the authentication mode for the second user, the processor is further configured to:
acquire a front face feature and a side face feature of the second user if the user information of the second user is included in the first user information; and
determine the authentication mode for the second user based on the front face feature and the side face feature of the second user.

13. The electronic device of claim 11, wherein in determining the authentication mode for the second user, the processor is further configured to:
acquire a front face feature of the second user if the user information of the second user is not included in the first user information; and
determine the authentication mode for the second user based on the front face feature of the second user.

14. The electronic device of claim 11, wherein in determining the authentication mode for the second user, the processor is further configured to:
prompt the second user to activate an authentication mode other than a face authentication mode, if the user information of the second user is included in the second user information.

15. A non-transitory computer-readable storage medium having stored thereon instructions that, when executed by a processor of a device, cause the device to perform an authentication method, the method comprising:
acquiring a front face feature and a side face feature of a first user in response to a face authentication request of the first user;
searching, based on the front face feature and the side face feature of the first user, a first list of users of multiple births corresponding to the first user for a candidate user matching both the front face feature and the side face feature of the first user, wherein the first list of users of multiple births corresponding to the first user is a list of users of multiple births with similar front face features and non-similar side face features; and
determining, based on consistency between the candidate user and the first user in the front face feature and the side face feature, whether the first user succeeds in authentication.

16. The non-transitory computer-readable storage medium of claim 15, wherein the acquiring a front face feature and a side face feature of a first user comprises:
determining whether the first user is included in a second list of users of multiple births with similar front face features; and
acquiring the front face feature and the side face feature of the first user if it is determined that the first user is included in the second list of users of multiple births with similar front face features.

17. The non-transitory computer-readable storage medium of claim 15, wherein the determining, based on consistency between the candidate user and the first user in the front face feature and the side face feature, whether the first user succeeds in the authentication comprises:
- determining that the first user succeeds in the authentication if the candidate user is consistent with the first user in both the front face feature and the side face feature; and
- determining that the first user fails in the authentication if the candidate user is inconsistent with the first user in the front face feature or the side face feature.

18. The non-transitory computer-readable storage medium of claim 15, wherein the method further comprises:
- acquiring user information of a second user in response to a request for activating a face authentication mode from the second user; and
- determining an authentication mode for the second user based on first user information of users with similar front face features and non-similar side face features in a second list of users of multiple births, second user information of users with similar front face features and similar side face features in the second list of users of multiple births, and the user information of the second user.

19. The non-transitory computer-readable storage medium of claim 18, wherein the determining an authentication mode for the second user further comprises:
- acquiring a front face feature and a side face feature of the second user if the user information of the second user is included in the first user information; and
- determining the authentication mode for the second user based on the front face feature and the side face feature of the second user.

20. The non-transitory computer-readable storage medium of claim 18, wherein the determining an authentication mode for the second user comprises:
- acquiring a front face feature of the second user if the user information of the second user is not included in the first user information; and
- determining the authentication mode for the second user based on the front face feature of the second user.

* * * * *